RECEIVER AND DIVERSITY RECEIVER SYSTEM

Filed Jan. 29, 1948 2 Sheets-Sheet 1

INVENTOR
LEONARD R. KAHN
BY [signature]
ATTORNEY

INVENTOR
LEONARD R. KAHN
BY Harry Tonicke
ATTORNEY

Patented July 4, 1950 2,513,803

UNITED STATES PATENT OFFICE 2,513,803

RECEIVER AND DIVERSITY RECEIVER SYSTEM

Leonard R. Kahn, New York, N. Y., assignor to Radio Corporation of America, a corporation of Delaware Application January 29, 1948, Serial No. 5,018

4 Claims. (Cl. 250—8)

Figures 1, 2:
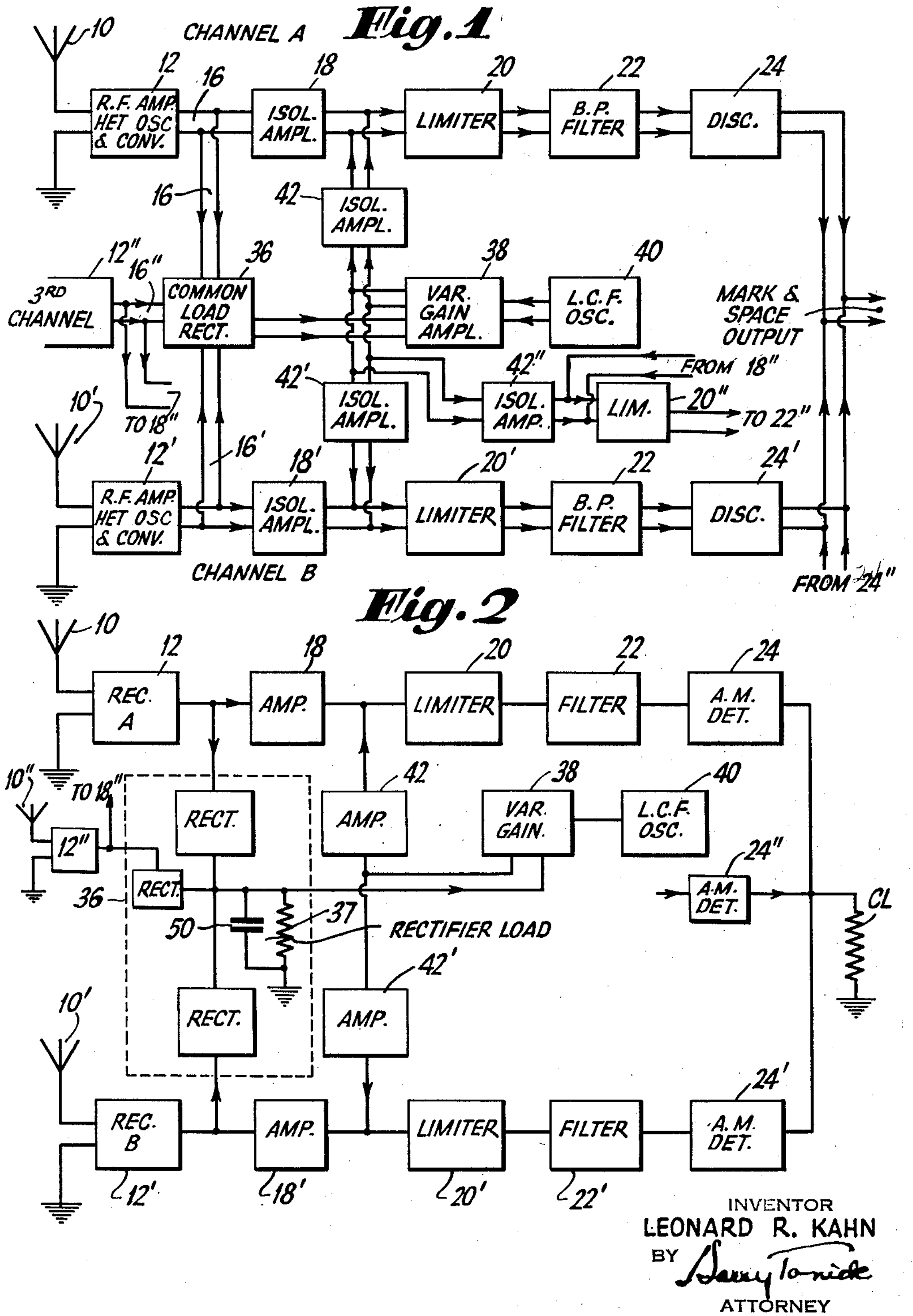

In this application I disclose a receiver for signals with improved means to reduce noise in the receiver output resulting from fading of the signal being received.

The invention is described as being used in telegraphy systems of the "on-off" type and frequency shift type. In "on-off" telegraphy signals, a carrier is transmitted and as transmitted is interrupted, being modulated to zero, with either the "on" or "off" periods representing signal elements. For positive signal recorder or rebroadcast control, in practice the signal "on" period is usually used to represent signal elements. In frequency shift telegraphy, the carrier is on continuously but its frequency is shifted from one value to another value and back with one frequency value representing marking intervals, the other frequency value representing spacing intervals.

In practice, as is well known, the signal carrier may fade out so that the signal-to-noise ratio becomes unfavorable and this results in distorted signals which are referred to as garbled signals in telegraphy practice.

An object of the present invention is to improve the signal-to-noise ratio of a signalling system. In the description which follows, reference is made to telegraphy systems of the frequency shifted and "on-off" type but the invention is applicable to voice modulation, facsimile, television and the like, in fact, to any system wherein a limiter is used in the signal channel before detection takes place.

In telegraphy systems as known today, diversity effects are made use of. The diversity effects may result from physical spacing of two or more antennas picking up the same signal or from use of different frequencies or from use of antennas with different polarization characteristics. These diversity effects are used to obtain the best signal and to overcome the effects of fading as described above since fading at different points is different and at different frequencies is different and fading effects on antennas of different polarization are also different.

A further object of my invention is to improve the signal-to-noise ratio in the individual receivers of a diversity system and to also provide improved diversity action.

In diversity systems, the signal channel selecting or diversity action is obtained by comparing the relative strengths of the signals in the plurality of channels and detecting the same to produce a potential used for turning on a gating tube in the channel wherein the strongest signal appears. These systems are somewhat complicated. Especially is this so where more than two channel diversity effects are to be used. Other systems make use of a common detector load wherein a potential is developed which builds up in such a manner as to block all of the detectors except that one being supplied the strongest signal. In these systems, the weaker channels are not completely blocked so that the action is combining rather than selection of one signal only. Moreover, these systems are not applicable to frequency shift reception because a limiter is used in each receiver and the outputs are of the same magnitude and would be ineffective in a common load to block the weaker channels. However, in these systems, the use of more than two channels in diversity is relatively simple and a further object of my invention is to improve the switching action in a diversity system of the latter type and in particular in frequency shift keying systems comprising three or more channels in diversity.

In "on-off" telegraphy systems, noise in the receiver in the signal "off" or "space" condition may operate the recording apparatus and a further object of my invention is to provide means to block all output from the receiver in the intervals between marking elements.

In describing my invention in detail, reference will be made to the attached drawings wherein Figs. 1 and 2 illustrate two embodiments of diversity systems arranged and operated in accordance with my invention. In Fig. 1, the receiver is arranged to receive frequency modulated signals. In Fig. 2 the apparatus is conditioned to receive amplitude modulated signals of any type which may be limited before detection.

Figure 4:
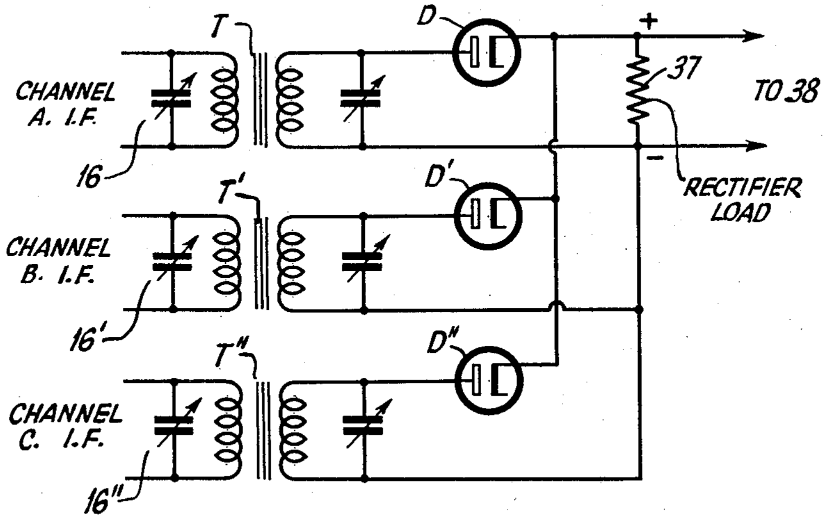
Figure 3:
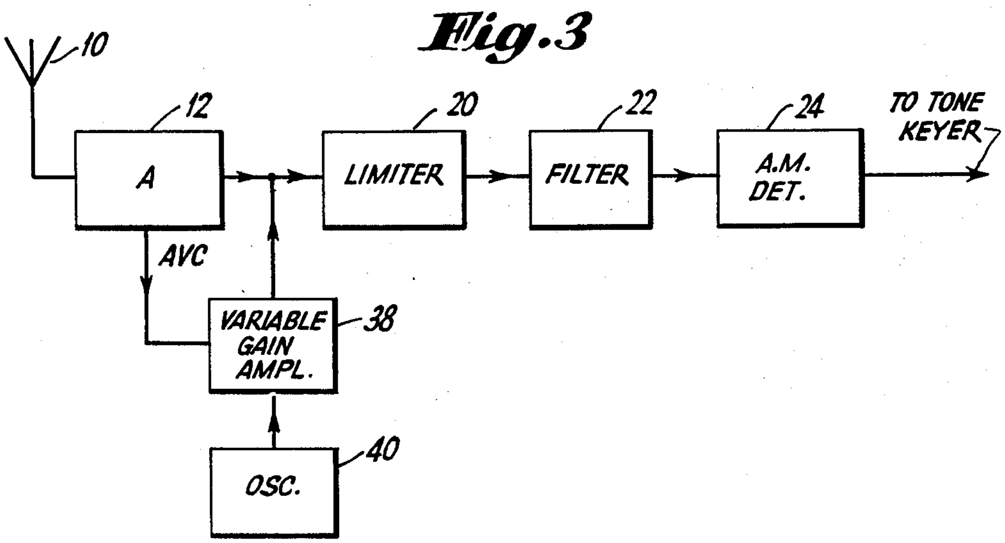

Fig. 3 illustrates an "on-off" telegraphy receiver making use of my invention, while, Fig. 4 illustrates a blocking detector system used in Figs. 1 and 2 to derive a control potential.

In Fig. 1, I have shown a triple diversity system of which two channels are shown. There may be more channels added as desired. The two channels are designated channels A and B. In describing the system, reference will be made to the elements of channel A since to some extent, the channels are similar. Where similar elements are found in channel B, corresponding references primed will be applied thereto.

Channel A comprises an antenna system 10 located at a spaced point or in different polarization with respect to the antenna system 10'. The antenna system A feeds one version of the signal to apparatus in unit 12. This apparatus in unit 12 may include radio frequency amplifiers, a first heterodyne oscillator and detector with first intermediate frequency amplifiers and, if desired, a second heterodyne oscillator and detector with second intermediate frequency amplifiers. The receivers may include automatic gain control circuits so that energy of intermediate frequency appears on the lines 16 of a substantially constant and adjustable amplitude so that the energy at this point in each receiver is proportional to the energy picked up by the receiver antenna system 10 or 10′. This intermediate frequency energy which carries the signal is supplied to an amplifier 18 and from the amplifier 18 to a limiter 20. The amplifier 18 is again of fixed adjustable gain so that its output magnitude is proportional to the magnitude of energy picked up at 10. The limiter in 20 supplies its output to a band pass filter 22, the purpose of which will be described hereinafter, and from this band pass filter 22 to a detector unit 24. This unit 24 in the embodiment being described is a discriminator and detector such as, for example, shown in Conrad Patent #2,151,747, dated March 28, 1939, and Seeley U. S. Patent #2,121,103, dated June 21, 1938, or modifications thereof. The discriminators each include a detector and the output are filtered and may be considered direct current of varying magnitude which goes to a common output circuit for use as desired. In my improved system, this output is supplied by one receiver only at a time, being supplied by the channel having the strongest signal. The output energy may operate a tone keyer feeding a recorder or teletypewriter or it may feed the teletypewriter or recorder more directly.

Intermediate frequency output is also supplied by lead 16 to a separate rectifier circuit in 36. Intermediate frequency output from the other channels is also supplied to separate rectifiers and the rectifiers have a common load impedance so that rectified current appears in said common load. The diode rectifiers are so arranged that the one supplied with the weaker signals are blocked by the potential developed in the common load by the rectified signal from the channel getting the strongest signal. The rectified signals therefore develop across the common load a potential the magnitude of which is proportional to the strength of the signal in the channel getting the strongest signal. The principle involved here is in general as described in Peterson U. S. Patent #2,290,992. A satisfactory blocking detector system is shown in Fig. 4. Transformers T, T′ and T″ feed the IF current to rectifiers D, D′ and D″ connected in like polarity to a common load 37. The potential at the end of resistor 37 adjacent the diode cathodes is positive when current is rectified and the load is so proportioned that this positive potential on the diode cathodes with respect to the negative potential on the diode anodes is sufficient to block the diodes except that one supplied with the strongest signal.

The potential drop in the load impedance 37 is used to control the gain of a variable gain amplifier 38 supplying oscillations from unit 40 by way of amplifier 42 to the limiter 20 input. The oscillator 40 is referred to herein as a local comparison frequency oscillator since the oscillations are supplied to the limiter 20 and in a sense compared as to magnitude with the signal supplied thereto from the amplifiers 18. The purpose of this is to make use of the thresholding characteristic of a limiter to pass therethrough signal from 18 to the exclusion of noise and oscillations from 40 or if the signal is too weak, oscillations from 40 to the exclusion of noise and the signal. The amplifiers 18, 18′ and 42 and 42′ have additional functions of isolating the receivers 12 and 12′ from each other and from their limiters.

I do not want to supply oscillations from 40 to the discrimator and detector 24, in the event they are of magnitude greater than the signal and noise, and pass through the limiter. I, therefore, provide the band pass filter at 22 and make the frequency of the oscillations 40 sufficiently different from the frequency of the intermediate frequency energy supplied to the limiter and filter 22 to be blocked by filter 22. In other words, only the intermediate frequency including the carrier and necessary side bands passes through the filter 22.

In operation, the amplitude of the oscillations supplied by the variable gain amplifier 38 from oscillator 40 to limiter 20 is automatically maintained, by amplifier gain and adjustment of the rectifier circuits in 36, a few decibels below the level of the signal from the strongest channel at its limiter input. This oscillation magnitude is determined by operation of the receiver and its antenna location and amplifier gain and adjustment is made to obtain the values as desired. Each limiter receives the output of its receiver 12 and also oscillations from oscillator 40. If the receiver output is of lesser amplitude than the local comparison frequency oscillations from 40, the said oscillations will suppress that receiver output. The strongest receiver output will pass through its limiter and will determine the diversity units output. The other limiters will supply oscillations from the low frequency comparison source 40 which will not pass through the band pass filter.

The limiter in 20 may be conventional. It is essential, however, that the limiter be sensitive to input voltage differences so that the thresholding action is complete and the output represents the strongest input signal. A limiter as disclosed in Crosby U. S. Patent #2,276,565 is satisfactory for use if the intermediate frequency is not too high.

In the embodiment of Fig. 2, which is for "on-off" keying, three channels are assumed. More channels may be used. The antenna 10, receiver 12, limiter 20 and filter 22 with the variable gain amplifier 38 may be substantially as illustrated and described above. The detector 24 is of the amplitude modulation type since I have assumed the signals here to comprise carrier and side band energy keyed on and off in accordance with telegraphy signals. The apparatus in 36 may also be as described above and may comprise a common load 37 fed by rectified current from a separate rectifier coupled to the lines 16, 16′ etc. Here, however, a capacitor 50 is connected across the common load impedance 37 so that the gain control potentials do not follow the keying. Here again oscillations of controlled amplitude are supplied to the limiter 20. For example, these oscillations may be of 50.3 kc. assuming that the intermediate frequency out of the receiver 12 is 50 kc. ± the necessary side bands which may, for example, comprise 250 cycles on each side. Then the filter 22 will pass only the signal and will block off the local space frequency oscillations from unit 40 in the event they get through the limiter by virtue of thresholding action. The amplitude of the local space frequency oscillations from unit 40 is controlled by the potential developed across common load 37 which is in a network with a long time constant so that it does not vary with the incoming signal keying but is proportional to the average signal strength. The magnitude of the oscillations is adjusted to be a few decibels below the magnitude of the 50 kc. output of the receiver having the strongest signal. The incoming "on-off" signal, the noise and the said oscillations are fed to the limiter 20. When the "on-off" signal is "on" the limiter in the strongest channel suppresses the local space frequency oscillations and the noise. Then the signal only is fed to the filter 22 and detector 24. When the signal is "off" the local space frequency oscillator suppresses the noise. Oscillations from 40 cannot pass through the filter 22 and the output of the unit is zero. The remaining channels may be arranged in like manner and all of the detectors may supply output to a common load CL.

My invention is applicable to single receivers of the "on-off" telegraphy type, to reduce noise on "space" or "off" condition. Then on "space" the oscillations from 40 take over and due to the thresholding action in limiter 20 block all noise and signal from the output. The output across the load CL is always constant on "mark" due to the limiting action when the signal takes control of the limiter. Such an arrangement is shown in Fig. 3, where a single receiver is used. The receiver AVC potential may be fed to the variable gain amplified to control the magnitude of the oscillations from source 40 fed to the limiter. It is to be kept in mind that the magnitude of the signal input to the limiter is to be properly related to the magnitude of the oscillations from 40. Here both are made proportional to the signal picked up in the signal "on" condition.

What is claimed is:

1. In a diversity system, in combination, a plurality of signal receivers each comprising a limiter, a filter and a detector in cascade in the order given, said filters each being adjusted to pass a band of frequencies including the signals, a common output circuit coupled to all of said detectors, a source of oscillatory energy of a freguency outside the pass band of said filter, a variable gain amplifier coupling said source to the input of the limiter in each receiver, a rectifier for each receiver excited by the signal therein, a common load impedance for said rectifiers, and means for controlling the gain of said amplifier in accordance with the potential across said common load impedance.

2. In a diversity receiver, in combination, a plurality of signal pick-up devices responsive to radiant energy signals, a common output circuit, a plurality of signal amplifiers each including a limiter and a discriminator detector, there being a signal amplifier coupled to each pick-up device, a circuit coupling the outputs of all of the discriminator detectors to said common output circuit, a source of oscillations, connections between said source and the inputs of all of the limiters, a variable gain amplifier in a common portion of said connections, a rectifier coupled to each of said first named amplifiers, a common load for said rectifiers, and means for controlling the gain of said variable gain amplifier in accordance with the potential developed in said common load.

3. In a diversity receiver for "on-off" telegraphy signals, in combination, a plurality of signal pick-up devices responsive to said signals, a common output circuit, a plurality of signal amplifiers each including a limiter and a detector, there being a signal amplifier coupled to each pick-up device, a circuit coupling the outputs of all of the detectors to said common output circuit, a source of oscillations, connections between said source and the inputs of all of the limiters, a variable gain amplifier in a common portion of said connections, a rectifier for each pick-up device excited by energy proportional to the signal picked up thereby, a resistor and a capacitor in a time delay network connected to all of said rectifiers, and connections from said resistor to said variable gain amplifier for controlling its gain in accordance with the current in the common output of said rectifiers.

4. In a diversity system, a plurality of signal receivers each including a signal amplifier, all of which amplifiers are of like over-all gain, a detector for each signal receiver, means coupling each detector to the output of its corresponding amplifier, a current amplitude limiter in each coupling for feeding the signals to the corresponding detector, a source of oscillations of a frequency different from the signal frequency, connections between said source and the inputs of all of said limiters, a variable gain amplifier in said connections, apparatus for controlling the gain of the last named amplifier in accordance with the magnitude of the signals supplied to the first named amplifiers, and a common output coupled to all of the detectors.

LEONARD R. KAHN.

REFERENCES CITED

The following references are of record in the file of this patent:

UNITED STATES PATENTS

| Number | Name | Date |
|---|---|---|
| 1,373,931 | Alexanderson | Apr. 5, 1921 |
| 2,059,321 | Drake | Nov. 3, 1936 |
| 2,087,288 | Landon | July 20, 1937 |
| 2,108,117 | Gardere et al. | Feb. 15, 1938 |
| 2,212,540 | Haffcke | Aug. 27, 1940 |
| 2,214,929 | Koschmieder | Sept. 17, 1940 |
| 2,253,867 | Peterson | Aug. 26, 1941 |
| 2,316,851 | Foster | Apr. 20, 1943 |
| 2,387,632 | Young | Oct. 23, 1945 |
| 2,395,737 | Hansell | Feb. 26, 1946 |
| 2,451,916 | Chapin | Oct. 19, 1948 |
| 2,462,224 | Rheams | Feb. 22, 1949 |